United States Patent [19]

Hotta et al.

[11] 4,062,997
[45] Dec. 13, 1977

[54] OLEFIN RESIN-METAL BONDED STRUCTURE

[75] Inventors: Hisashi Hotta; Fumio Mori, both of Yokohama, Japan

[73] Assignee: Toyo Seikan Kaisha Limited, Tokyo, Japan

[21] Appl. No.: 678,053

[22] Filed: Apr. 19, 1976

[30] Foreign Application Priority Data

Apr. 22, 1975   Japan ................................. 50-48227

[51] Int. Cl.$^2$ ............................................. D02G 3/00
[52] U.S. Cl. ................................... 428/378; 428/380; 428/425; 428/416; 428/458; 428/460; 428/461; 428/462; 428/474; 428/516; 428/517; 428/518; 428/519; 428/520; 113/121 R; 113/121 A; 113/1 F; 113/80 D; 427/318
[58] Field of Search ............... 428/378, 380, 425, 416, 428/458, 460, 462, 463, 474, 461, 516–520; 427/318

[56]   References Cited

U.S. PATENT DOCUMENTS

| 3,540,452 | 11/1970 | Usher et al. ....................... 428/461 X |
| 3,719,541 | 3/1973  | Takahashi et al. ................ 428/461 X |
| 3,808,047 | 4/1974  | McAda ............................... 428/463 X |
| 3,931,448 | 1/1976  | Parkinson ......................... 428/460 X |
| 3,952,136 | 4/1976  | Yoshikawa et al. .............. 428/461 X |
| 3,956,212 | 5/1976  | Sakaguchi et al. ............... 428/461 X |

Primary Examiner—P. C. Ives
Attorney, Agent, or Firm—Diller, Brown, Ramik & Wight

[57]   ABSTRACT

An olefin resin-metal bonded structure having a desirable combination of high corrosion resistance and peel strength, which comprises a metal substrate and an olefin resin layer bonded together through a primer layer, said primer layer containing (A) an oxidized polyethylene having an oxygen content of 0.1 to 10% by weight, a saponification value of 2 to 200, a density of 0.90 to 1.2 and an average molecular weight of 1000 to 50000 and (B) a coating-forming base resin having a density higher by at least 0.1 than the oxidized polyethylene and containing a functional group selected from hydroxyl and carbonyl groups at a concentration of at least 1 meq/g, the mixing weight ratio of the oxidized polyethylene (A) and the base resin (B) being within the following range:

(A) : (B) = from 0.2 : 99.8 to 45 : 55, wherein said primer layer has a multi-layer structure in which each of the concentrations of the oxidized polyethylene (A) and the base resin (B) is changed with respect to the thickness direction with a certain gradient so that the base resin (B) is distributed predominantly on the side of the surface of the metal substrate and the oxidized polyethylene (A) is distributed predominantly on the side of the surface of the olefin resin.

8 Claims, No Drawings

OLEFIN RESIN-METAL BONDED STRUCTURE

This invention relates to an olefin resin-material bonded structure having a desirable combination of a high corrosion resistance and a high peel strength. More particularly, the invention relates to an olefin resin-metal bonded structure comprising a metal substrate and an olefin resin layer, said metal substrate and olefin resin layer being bonded together through a primer layer of a multi-layer structure comprising a specific combination of an oxidized polyethylene and a coating-forming base resin, in which each of the concentrations of the oxidized polyethylene and base resin is changed with respect to the thickness direction with a certain gradient.

As crown caps and other sealing closures of vessels, containers, bottles and the like, there are broadly used products formed by coating a surface-protecting paint on a metal sheet, molding the coated metal sheet into a crown shell, a cap or the like, and bonding a packing on the inner face of the molded article. Cork discs have heretofore been used as such packings. These cork discs are defective in that since individual discs cut from cork should be supplied one by one into interiors of respective container caps and bonded thereto by using an adhesive such as albumin, the productivity is very low.

Many proposals have heretofore been made as to methods comprising applying a solution, sol or melt of a synthetic resin or rubber to the interior of a metal cap and preparing in situ a packing bonded to the metal cap, and some of these proposals have been worked on an industrial scale. As a typical instance of such methods, there can be mentioned a method comprising applying a foaming agent-containing or foaming agent-free plastisol of a vinyl chloride resin to the interior of a cap, molding the plastisol into a desired packing form by stamping or centrifugal molding, gelling the plastisol composition to form an elastic packing. According to this method, the manufacturing rate of container caps is relatively high and waste of the material is relatively small. However, this method is still insufficient in the point that heating should be conducted for a certain period of time to accomplish gelation of the plastisol and since a relatively large amount of a plasticizer is contained in the packing, this plasticizer tends to migrate into a content food and damage the flavor thereof.

An olefin resin such as polyethylene is excellent in sanitary characteristics to foods and has a high moisture resistance. Accordingly, use of an olefin resin for production of packings of container caps has heretofore been proposed. According to this past proposal, a melt of an olefin resin is supplied in the form of a lump to the inner face of a metal cap and this lump is stamped under cooling to mold it into a packing. According to this method, however, in order to prevent corrosion of the metal material, it is necessary to apply an under-coating paint (primer) to the metal surface prior to formation to packings. Olefin resins can adhere to the metal surface per se to some extent, but their bondability to primers coated on the metal surface for protection thereof is very poor. Because of this poor bondability to primers, there are brought about great disadvantages in container caps provided with an olefin resin packing. For example, when these caps are fed to a cap-feeding chute of a device of filling a content into a container and sealing it with a cap or while these caps are being transported, packings are frequently separated from the metal caps.

Structures formed by applying an anti-corrosive primer to the surface of a metal substrate for preventing corrosion of the metal substrate, applying an olefin resin onto this primer layer and bonding the olefin resin to the metal substrate through the primer layer are demanded in not only the above-mentioned container caps but also such articles as lined containers, construction materials, laminate tapes and the like. None of the known primers to be applied to metal surfaces, such as epoxy-phenol resins, epoxy-amino resins, epoxy-acrylic resins and vinyl chloridevinyl acetate copolymer resins can provide structures of this type that can be used satisfactorily in the above-mentioned fields.

We found that in bonding an olefin resin layer to a metal substrate through a primer layer, if a combination of (A) a specific oxidized polyethylene and (B) a specific coating-forming base resin is dissolved in a specific mixed solvent and the solution is coated as a primer and baked, in the resulting primer there can be formed a multi-layer structure in which the base resin (B) is distributed predominantly on the side of the surface of the metal substrate and the oxidized polyethylene (A) is distributed predominantly on the side of the surface of the olefin resin; namely, each of the concentrations of the oxidized polyethylene (A) and the base resin (B) is changed with respect to the thickness direction with a certain gradient, and the bonding strength between the metal substrate and the olefin resin is drastically enhanced and both the processability of the olefin resin-metal bonded structure and the corrosion resistance of the metal substrate can be highly improved. Based on this finding, we have now completed this invention.

It is a primary object of this invention to provide an olefin resin-metal bonded structure having a desirable combination of an improved bonding strength and a high corrosion resistance, which is characterized in that even when the bonded structure is subjected to processing under severe conditions, the interlaminar peel strength and corrosion resistance can be maintained at high levels.

Another object of this invention is to provide a novel olefin resin-metal bonded structure comprising a metal substrate and an olefin resin bonded together through a primer layer composed of an oxidized polyethylene and a coating-forming base resin and having a specific multi-layer structure in which each of the concentrations of the oxidized polyethylene and base resin is changed with respect to the thickness direction with a certain gradient.

Still another object of this invention is to provide a sealing closure of a vessel such as a crown cap comprising a vessel cap and an inner packing of olefin resin packing having excellent sanitary characteristics and moisture permeation resistance and a good cushioning property to a vessel mouth such as a bottle mouth, which is excellent in the corrosion resistance of the vessel cap and the resistance to peeling of the inner packing from the vessel cap.

Other objects and advantages of this invention will be apparent from the following detailed description.

In accordance with this invention, there is provided an olefin resin-metal bonded structure having a desirable combination of high corrosion resistance and peel strength, which comprises a metal substrate and an olefin resin layer bonded together through a primer layer, said primer layer containing (A) an oxidized polyethylene having an oxygen content of 0.1 to 10% by weight, a saponification value of 2 to 200, a density of 0.90 to 1.2 and an average molecular weight of 1000 to 5000 and (B) a coating-forming base resin having a density higher by at least 0.1 than the oxidized polyethylene and containing a functional group selected from hydroxyl and carbonyl groups at a concentration of at least 1 meq/g, the mixing weight ratio of the oxidized polyethylene (A) and the base resin (B) being within the following range:

(A) : (B) = from 0.2 : 99.8 to 45 : 55, wherein said primer layer has a multi-layer structure in which each of the concentrations of the oxidized polyethylene (A) and the base resin (B) is changed with respect to the thickness direction with a central gradient so that the base resin (B) is distributed predominantly on the side of the surface of the metal substrate and the oxidized polyethylene (A) is distributed predominantly on the side of the surface of the olefin resin.

In this invention, as the metal substrate, there can be employed various metals and metal alloys such as steel, copper, aluminum, zinc, stainless steel, bronze, cupronickel, duralmin and diecasting metal. The metal substrate may be steel plated with zinc, tin, chromium, aluminum or the like, or steel chemically treated with phosphoric acid or chromic acid or electrolytically treated with chromic acid. The metal substrate can take an optional form. For example, it may take a form of a metal foil, a rolled plate, a panel, a sheet, a pipe, a rod, a beam or other molded article. In addition, the metal substrate may take a form of a wire, a twisted wire, a crown shell or other container cap, or a can or other container or vessel. Still in addition, the metal substrate may take a form of a construction part or a vehicle part.

This invention is especially preferably applied to untreated steel plates (so-called black plates), steel plates having the surface chemically treated with phosphoric acid or chromic acid or electrolytically treated with chromic acid and steel plates having the surface plated electrolytically or melt-plated with tin, zinc or the like. According to this invention, the corrosion resistance and the adhesion to an olefin resin can be highly improved in these metal substrates.

These metal substrates may have the surface preliminarily coated with a known anti-corrosive primer resin such as a phenolic-epoxy resin, a epoxy-amino resin, e.g., a epoxy-urea resin, a phenolic-epoxy-vinyl resin, an epoxy-vinyl resin and a vinyl-phenolic resin in an amount coated of 10 to 200 mg/dm² (as the solid).

One of the important features of this invention is that in bonding an olefin resin layer to such metal substrate through a primer layer, a combination of a specific oxidized polyethylene (A) and a specific coating-forming base resin (B) is coated in the form of a solution in a specific mixed solvent and baked to form a primer layer having a multi-layer structure in which each of the concentrations of the oxidized polyethylene (A) and the base resin (B) is changed with respect to the thickness direction with a certain gradient so that the base resin (B) is distributed predominantly on the side of the surface of the metal substrate and the oxidized polyethylene (A) is distributed predominantly on the side of the surface of the olefin resin.

The oxidized polyethylene should have an oxygen content of 0.1 to 10% by weight, preferably 0.5 to 5% by weight, a saponification value of 2 to 100, preferably 5 to 60, a density of 0.90 to 1.2, preferably 0.95 to 1.00 and an average molecular weight of 1000 to 50000, preferably 4000 to 10000. In order to obtain a primer layer having the above-mentioned specific concentration gradient manifested therein with respect to the thickness direction and to improve the mechanical bonding strength between the polyolefin layer and the primer layer and the water-resistance or processability of the bonded structure, it is important that the oxidized polyethylene (A) should have the above properties.

The oxygen content and saponification value of the oxidized polyethylene have close relations to the compatibility or affinity with the coating-forming base resin (B) and the polyolefin layer and to the capability of forming a multi-layer structure having the above-mentioned concentration gradient with respect to the thickness direction. For example, when both the oxygen content and the saponification value of the oxidized polyethylene are lower than the above ranges, it is difficult to incorporate the oxidized polyethylene (A) into the base resin (B) and the cohesive failure is readily caused in the primer layer. When both the oxygen content and the saponification value are higher than the above ranges, though a satisfactory compatibility is obtained between the oxidized polyethylene and the base resin, the compatibility or affinity of the primer layer with the olefin resin layer is degraded and interlaminar peeling is caused relatively readily in the interface between the primer layer and the olefin resin layer. Further, when the oxygen content of the oxidized polyethylene (A) is lower than the above range, the dispersion state of the oxidized polyethylene becomes coarse and it is difficult to distribute the oxidized polyethylene in the laminar state with the above-mentioned concentration gradient manifested with respect to the thickness direction. Still further, if the oxygen content of the oxidized polyethylene (A) is higher than the above range, it becomes difficult to distribute the oxidized polyethylene (A) and the base resin (B) with the above-mentioned concentration gradients manifested with respect to the thickness direction. Accordingly, in each case, the intended objects of this invention cannot be attained satisfactorily. It is believed that a part of the oxygen in the oxidized polyethylene is present in the form of a carboxyl or carboxylic acid ester group at terminal ends of the polymer chain and the remainder is present midway of the polymer chain in the form of an ether or ketone group.

In order to obtain a good compatibility between the oxidized polyethylene (A) and the olefin resin layer or the coating-forming base resin (B) and a multi-layer structure having the above-mentioned concentration gradient, it is important that the density of the oxidized polyethylene (A) should be 0.90 to 1.2, especially 0.95 to 1.0, though preferred values of the density vary to some extent depending on the crystallization degree or oxygen content of the oxidized polyethylene. It is believed that an oxidized polyethylene having a higher crystallinity, namely a higher density, has a better compatibility with the olefin layer to be applied on the primer layer. It is also believed that as the oxygen content in the oxidized polyethylene increases while the crystallinity is maintained at the same level, the compatibility of the oxidized polyethylene with the basic resin constituting the primer increases. However, if the density of the oxidized polyethylene is too high, it is difficult to manifest the above-mentioned concentration gradient in the primer layer. In view of the oxygen content and other requirements, it is not permissible to decrease the density of the oxidized polyethylene below the above range.

In view of the coating-forming property and the bonding strength or processability of the bonded structure, it is also important that the number average molecular weight of the oxidized polyethylene (A) that is used in this invention should be within the abovementioned range. More specifically, in order to obtain a bonded structure having excellent peel strength and processability, it is necessary that the oxidized polyethylene (A) should have a molecular weight of at least 1000, especially at least 4,000, and in view of the compatibility with the primer-forming base resin (B) and the adaptability to the coating operation, it is important that the oxidized polyethylene (A) should have a molecular weight not higher than 50,000, especially not higher than 10,000.

The oxidized polyethylene to be used in this invention is a product obtained by oxidizing an ethylene homopolymer or a copolymer composed mainly of ethylene, if desired in the molten state or in the form of a solution, so that all of the above-mentioned requirements are satisfied. In general, if the oxygen content of an ordinary oxidized polyethylene is merely increased, reduction of the crystallinity of the oxidized polyethylene and of the molecular weight is caused, and as a result, the bondability of the olefin resin to the primer tends to decrease. Therefore, in this invention, in order to obtain an olefin resin-metal bonded structure especially excellent in the peel resistance, it is important to select an oxidized polyethylene having a relatively high density though the oxygen content is maintained at a relatively high oxygen content. In this invention, it is especially preferred to use an oxidized polyethylene having an oxygen content of 0.5 to 7.0% by weight and a density of 0.95 to 1.0.

In order to form the above-mentioned multi-layer distribution structure in the primer layer and to improve the bondability of the primer layer to the metal substrate, it is important that the coating-forming base resin (B) that is used in combination with the oxidized polyethylene (B) should have a density higher by at least 0.1 than the density of the oxidized polyethylene (A), preferably a density of 1.2 to 1.3 and should contain a functional group selected from hydroxyl and carbonyl groups at a concentration of at least 1 meq/g, preferably 3 to 20 meq/g.

When the density of the primer coating-forming based resin (B) is not higher by at least 0.1 than the density of the oxidized polyethylene (A), a primer layer is which both the resins are mixed in the homogeneous state is obtained and it is often difficult to form in the primer layer a multi-layer structure having the above-mentioned specific concentration gradient. In the primer layer in which both the resins are homogeneously distributed, the bonding strength of the primer layer to the metal substrate or the olefin resin layer is lowered and there is observed a tendency that the mechanical strength and the corrosion resistance of the primer coating per se are reduced. When the concentration of the functional group selected from hydroxyl and carbonyl groups is lower than 1 meq/g in the base resin (B), the adhesion of the primer layer to the metal substrate or the corrosion resistance becomes insufficient.

In the primer coating-forming base resin that is used in this invention, the hydroxyl group may be contained in the form of a alcoholic or phenolic hydroxyl group or combination thereof, and it may be included in either the main chain or side chain of the polymer. The carbonyl group may be contained in either the main chain or side chain of the polymer in the form of a carboxylic acid, carboxylic acid salt, carboxylic acid ester, carboxylic acid amide, ketone, imide, urea or urethane.

As the base resin (A) of the primer, there can be used any of the thermosetting and thermoplastic resin vehicles customarily used in this field, so far as the above requirements are satisfied. For example, resins meeting the foregoing requirements are selected among thermosetting resins such as phenol-formaldehyde resins, urea-formaldehyde resins, melamine-formaldehyde resins, xylene-formaldehyde resins, epoxy resins, alkyd resins, polyester resins, thermosetting acrylic resins, urethane resins and mixtures thereof, and thermoplastic resins such as acrylic resins, vinyl chloride-vinyl acetate copolymers, vinyl chloride-vinyl acetate-maleic acid copolymers, vinyl butyral resins, other vinyl resins, styrene-butadiene-acrylic acid ester copolymers and polyamide resins.

Primer coating-forming base resins preferably employed in this invention are so-called thermosetting resins, and among thermosetting resins, phenolic resin-epoxy resin paints, urea resin-epoxy resin paints, melamine resin-epoxy resin paints and phenolic resin-epoxy resin-vinyl resin paints are especially preferred.

The above-mentioned oxidized polyethylene (A) and coating-forming base resin (B) are combined at an (A) : (B) mixing weight ratio ranging from 0.2 : 99.8 to 45 : 55. In this invention, by virtue of the characteristic feature that in the primer layer the oxidized polyethylene (A) is distributed predominantly in the portion adjacent to the olefin layer and the base resin (B) is distributed predominantly in the portion adjacent to the metal substrate, there can be attained an advantage that even if the content of the oxidized polyethylene (A) is as low as 0.2%, the bonding strength between the primer layer and the olefin resin layer is enhanced and even when the content of the base resin (B) is as low as 55%, the adhesion between the primer layer and the metal substrate is enhanced.

In order to form a primer layer having the abovementioned multi-layer distribution structure in this invention, it is necessary to use a mixed solvent consisting of a plurality of solvents in which the difference of the boiling point of a solvent (S1) having a highest boiling point and the boiling point of a solvent (S2) having a lowest boiling point is at least 20° C., preferably at least 25° C. In this invention, the oxidized polyethylene (A) and the base resin (B) are dissolved in this mixed solvent and the solution is coated on the surface of the metal substrate.

When a single solvent or a mixed solvent in which the above-mentioned difference of the boiling points is smaller than 20° C. is employed, it is difficult to form the above-mentioned multi-layer distribution structure and processability of the primer-caoted metal substrate or the olefin resin-metal bonded structure is reduced, which will readily be understood from data shown in Table 4 of Example 7 given hereinafter. In contrast, when the oxidized polyethylene (A) and the base resin (B) are dissolved in the above-mentioned specific mixed solvent and the solution is coated and baked, as will be apparent from Examples given hereinafter, there is formed a coating having a multi-layer structure in which the oxidized polyethylene is distributed predominantly in the surface portion. The reason has not been completely elucidated but it is construed that during the drying or baking process or the solvent-evaporating process the temperature of the coating or the composition of the mixed solvent will be changed with a certain gradient and formation of the above multi-layer distribution structure will be promoted.

The high boiling point solvent (S1) is used in an amount of 10 to 70% by weight, preferably 20 to 60% by weight, based on the total mixed solvent, and the low boiling point solvent (S2) is used in an amount of 10 to 70% by weight, preferably 20 to 60%, based on the total mixed solvent. Solvents used are selected from ketones such as acetone, methylethyl ketone, methylisobutyl ketone, cyclohexanone and isophorone, alcohols such as diacetone alcohol, n-butanol, methyl cellosolve and butyl cellosolve, and aromatic hydrocarbons such as toluene and decalin, so that the above requirement of the boiling point difference is satisfied.

Preferred examples of the mixed solvent are methylisobutyl ketone/methylethyl ketone, methylisobutyl ketone/diacetone alcohol/xylene and n-butanol/xylene/cyclohexanone/isophorone.

For formation of a primer layer having a multilayer distribution structure, the oxidized polyethylene (A) and the base resin (B) are dissolved in the above-mentioned mixed solvent at a weight ratio mentioned above, namely at such a weight ratio that the amount of the oxidized polyethylene (A) is 0.2 to 45% be weight, preferably 1 to 30% by weight, especially preferably 16 to 25% by weight, based on the sum of (A) and (B), and the resulting coating liquid composition is coated on at least one surface of the metal substrate and then heated at a temperature higher than the melting point of the oxidized polyethylene (A) to thereby form a primer layer having the above-mentioned multi-layer distribution structure.

In forming the above coating solution, the base resin (B) is first dissolved in at least one of the above-mentioned solvent, and the oxidized polyethylene (A) in the state dissolved in hot xylene or in decalin is uniformly incorporated in the solution of the base resin (B). In general, the resin concentration is adjusted to 10 to 50% by weight in the so formed coating composition.

The amount of the primer coated on the surface of the metal substrate, namely the weight of the nonvolatile resin component per unit area of the surface of the metal substrate, is generally 10 to 500 mg/dm$^2$, preferably 30 to 100 mg/dm$^2$. If the amount of the primer coated is within the above range, a good combination of the corrosion resistance and the peel strength can be obtained. Further, it is preferred that the amount coated of the oxidized polyethylene contained in the primer be within a range of from 0.01 to 100 mg/dm$^2$, especially from 0.1 to 10 mg/dm$^2$ and the amount coated of the base resin (B) is 1 to 500 mg/dm$^2$, especially 10 to 100 mg/dm$^2$.

Prior to forming a primer layer on the surface of a metal substrate, the surface of the metal substrate is degreased and washed by known means, and then, a primer layer is formed on the degreased and washed surface of the metal substrate. Then, the above-mentioned liquid coating composition is applied to the degreased surface of the metal substrate.

The primer is coated on the metal substrate by known coating means, for example, a dip coating method, a spray coating method, a coating method using a roll coater or bar coater, an electrostatic coating method and an electrodeposition coating method.

The liquid coating composition-applied metal substrate is heated at a temperature higher than the melting point of the oxidized polyethylene, generally at 150° to 200° C. By this heat treatment, a multi-layer structure is formed in which the base resin (B) is distributed predominantly in the portion adjacent to the metal substrate and the oxidized polyethylene (A) is distributed predominantly in the surface portion of the primer layer. In case the base resin is a thermosetting resin, by this heat treatment the base resin is cured (set) and formation of the multi-layer distribution structure is further promoted.

An optional heat treatment apparatus can be used for this heat treatment, so far as the temperature condition is as mentioned above. For example, heating furnaces heretofore used for baking coatings, such as a hot air furnace, an infrared ray heating furnace, a high frequency induction heating furnace and the like can be used in this invention.

According to this invention, in the foregoing manner, there is formed a primer layer having a multilayer distribution structure in which each of the concentrations of the oxidized polyethylene (A) and base resin (B) is changed with respect to the thickness direction with a certain gradient so that the base resin (B) is distributed predominantly in the portion adjacent to the surface of the metal substrate and the oxidized polyethylene (A) is distributed predominantly in the portion adjacent to the olefin resin layer.

In this invention, it is possible to form a so-called double coat primer layer by coating in advance a known primer composition free of the oxidized polyethylene (A) on the metal substrate and then coating thereon the liquid coating composition containing the oxidized polyethylene (A) and the base resin (B).

The fact that the primer layer of this invention has the above-mentioned multi-layer distribution structure can be confirmed by dividing the primer layer in the thickness direction into an uppermost face layer (LS) farthest from the metal substrate, an intermediate layer (LM) and a bottom face layer (LB) adjacent to the metal substrate and determining distribution ratios (% by weight) of the oxidized polyethylene in all of these divided layers.

More specifically, the heat-treated primer coating is contacted with steel wool attached to a rotary shaft and a portion corresponding to a prescribed thickness (about 1 $\mu$) is peeled from the coating by abrasion. Iron is removed from the peeled powdery paint by using a magnet, and the remaining powder is subjected to infrared absorption spectrum analysis according to the KBr tablet method. An absorption not overlapping the absorption of the base resin (generally, an absorption at 2920 cm$^{-1}$ owing to expansion and contraction of the methylene group) is selected and the concentration of the oxidized polyethylene is determined based on a calibration curve prepared in advance.

In the primer layer of the bonded structure of this invention, the distribution ratios of the oxidized polyethylene layers are (i) at least 50% by weight, especially at least 70%, in the uppermost face layer (LS) and (ii) not higher than 10% by weight, especially not higher than 5% by weight, in the bottom face layer (LB).

The "distribution ratio" referred to herein has a meaning customarily used. Namely, the distribution ratio is expressed by the following formula:

$$Dx = \frac{Wx \times 10000}{W \times CA}$$

wherein W denotes the weight (mg/dm$^2$) of the primer layer per unit area, CA denotes the average content (% by weight) of the oxidized polyethylene in the primer layer, Wx denotes the weight (mg/dm$^2$) of the oxidized polyethylene per unit area in the divided layer of the primer layer (the layer LS, LB or LM), and Dx denotes the distribution ratio (% by weight) of the oxidized polyethylene in the divided layer.

By formation of the above-mentioned specific multi-layer distribution structure, the peel strength of the bonded structure is highly improved and also the corrosion resistance is improved. This will readily be understood from data shown in Table 3 of Example 6.

As the olefin resin to be used in this invention, there can be mentioned, for example, polyolefins such as low-density, medium-density and high-density polyethylenes, isotactic polypropylene, ethylene-butene-1 copolymers, polybutene-1, ethylene-hexene copolymers, ethylene-propylene copolymers, ethylene-propylene-nonconjugate diene terpolymers and the like, and olefin copolymers and modified polyolefins composed mainly of an olefin and containing a small amount of an ethylenically unsaturated monomer other than olefins. As such olefin copolymer or modified polyolefin, there can be mentioned, for example, ethylene-vinyl acetate copolymers (EVA), saponified ethylene-vinyl acetate copolymers (EVAL), ethylene-acrylic acid copolymers, ethylenemethyl methacrylate copolymers, unsaturated carboxylic acid-modified polyethylenes (as the unsaturated carboxylic acid, there are employed maleic acid, acrylic acid, methacrylic acid and esters thereof), unsaturated carboxylic acid-modified polypropylenes (as the unsaturated carboxylic acid, there are employed maleic acid, acrylic acid and esters thereof), ionomers, chlorosulfonated polyethylenes and the like.

These olefins can be used singly or in the form of mixtures of two or more of them. It is possible to incorporate into polyethylene, polypropylene or EVA, for example, 1 to 60% by weight of one or more of elastomers such as ethylene-propylene rubber (EPR), ethylenepropylene-diene rubber (EPDM), polyisobutylene (PIB), butyl rubber (IIR), polybutadiene (PB), natural rubber (NR), stereospecific polyisoprene, nitrile rubber (NR), styrene-propylene copolymers or block copolymers, styrene-isoprene copolymers or block copolymers, polychloroprene (CR) and the like, whereby elastic characteristics required of a packing or sealant can be improved.

According to known recipes, these polyolefins can be mixed with anti-oxidants or thermal stabilizers of the phenol, organic sulfur, organic nitrogen or organic phosphorus type, lubricants such as metallic soaps and other fatty acid derivatives, fillers such as calcium carbonate, white carbon, titanium white, magnesium carbonate, magnesium silicate, carbon black and various clays, colorants and other additives.

Further, in this invention, it is possible to form a layer of a foamed olefin resin or a cross-linked and foamed resin by incorporating a cross-linking agent or a foaming agent or both of them into the olefin resin to be used in this invention. For example, if it is intended to form a coating of an olefin resin excellent in mechanical properties such as elasticity on the metal substrate, it is preferred to incorporate a cross-linking agent in the resin. When it is intended to form a coating having a good cushioning property required of a packing or sealant, it is preferred to incorporate into the resin a foaming agent optionally together with a cross-linking agent.

As such cross-linking agent and foaming agent, there are employed cross-linking agents decomposing at a temperature approximating the processing temperature (the softening point) of the resin used, for example, organic peroxides such as dicumyl peroxide, di-tert-butyl peroxide, cumyl hydroperoxide and 2.5-dimethyl-2,5-di(tert-butylperoxy)hexine-3, and foaming agents decomposing at a temperature approximating the processing temperature of the resin used, for example, 2,2'-azobisisobutyronitrile, azodicarbonamides and 4,4'-hydroxybisbenzenesulfonyl hydrazide. The cross-linking agent is used in an amount of 0.1 to 5% by weight based on the resin, and the foaming agent is used in an amount of 0.2 to 10% by weight based on the resin.

The olefin resin is hot-bonded to the metal substrate through the primer layer at a temperature higher by at least 10° C. than a higher melting point between the melting point of the oxidized polyethylene (A) and the melting point of the olefin resin, generally at 120° to 300° C., especially at 150° to 230° C. The olefin resin is applied on the primer layer of the metal substrate in the form of a film, a sheet, a powder or other molded article, and the applied olefin resin is heated at the above temperature to fusion-bond it to the primer layer. Then, the olefin resin layer is cooled to bond it to the primer layer. The heating of the olefin is accomplished by such means as (1) passing the above assembly through a heating furnace, (2) heating the resin by heat transferred from a heated press or roll, (3) heating the metal substrate in advance or on application of the olefin resin by high frequency heating or the like to cause fusion bonding of the olefin resin, and (4) heating the olefin resin by infrared radiation, ultrasonic vibration radiation, plasma and laser.

According to another process, a melt of an olefin resin is extruded at the above temperature on a metal substrate on which a primer layer has been formed in advance, to thereby fusion-bond the olefin resin layer to the metal substrate through the primer layer. In this case, the molten olefin resin can be coated in the form of a continuous molded article such as a tape, a film, a sheet, a tube or a sheath on the metal substrate by the so-called extrusion coating method. Alternately, the molten olefin resin is extruded in the form of a lump on the metal substrate and is then molded in a desired form by a roll, a press or a stamper while being cooled, to thereby fusion-bond the olefin resin to the metal substrate. The former method is advantageous when it is intended to form a continuous coating of the olefin resin on the metal substrate, and the later method is advantageous when it is intended to form a layer on the olefin resin on a specific portion of the metal substrate.

The fusion bonding of the olefin resin to the metal substrate can be accomplished in a very short of the order of microseconds to milli-seconds.

When the olefin resin applied on the metal substrate is formed or cross-linked and foamed, after applying and fusion-bonding the olefin resin on the primer layer of the metal substrate the olefin resin is heated at a temperature higher than the decomposition temperature of the foaming agent or cross-linking agent.

In this invention, when the metal substrate is a thin structure such as a metal foil, a thin plate, a tube and a container, the olefin resin layer may be applied on one or both of the surfaces of the metal substrate. Further, it is possible to form a sandwich-like bonded structure by fusion-bonding both the surfaces of the olefin resin layer to two metal substrates having a form of a foil or sheet.

In the bonded structure of this invention, by bonding the metal substrate and the olefin resin layer through the primer layer having a specific multi-layer structure, the peel strength between the metal substrate and the olefin resin layer can be highly improved. In a bonded structure obtained by fusion-bonding an olefin resin layer to a metal substrate without provision of an intermediate primer layer, corrosion of the metal substrate is readily corroded from the interface between the metal substrate and the olefin resin layer. Further, in such bonded structure, if the entire face of the metal substrate is not completely covered with the olefin resin, extreme corrosion of the metal substrate is caused from edge portions or uncoated portions and with advance of the corrosion peeling of the olefin resin layer from the metal substrate is enhanced. In the bonded structure of this invention, occurrence of such undesired phenomena as corrosion of the metal substrate and peeling of the olefin resin layer from the metal substrate can be completely prevented by forming in advance a primer layer containing an oxidized polyethylene on the surface of the metal substrate.

As is apparent from the foregoing illustration, this invention is very effective and advantageous for production of crown caps, bottle caps, can closures and other container closures provided with a packing or sealant composed of an olefin resin. Further, because of the above-mentioned preferred combination of high peel resistance and high corrosion resistance, the bonded structure of this invention can be used very conveniently as cans, tanks, chemical reactors, lined vessels or containers such as flexible packages, construction materials such as wall plates and roofing materials, laminate tapes, decorative materials, heat-insulating materials, wire cables and various daily necessaries.

This invention will now be illustrated in detail by reference to the following Examples that by no means limit the scope of this invention.

EXAMPLE 1

A mixture of 1.0 mole of p-cresol, 1.2 moles of formaldehyde and 0.2 mole of ammonia was reacted on a water bath to form an ammonia-resol resin.

The so formed resin was dissolved in a 1:1 mixed solvent of methylisobutyl ketone (MIBK) having a boiling point of 117° C. and methylethyl ketone (MEK) having a boiling point of 79.6° C. so that the solid content in the resulting solution was 30% by weight. Separately, a bis-phenol A type epoxy resin (Epikote ® No. 1007 manufactured by Shell Chemical) was dissolved in a 1:1 mixed solvent of MIBK and MEK so that the solid content was 30% by weight. Both the solutions were mixed at such a ratio that the ammonia resol resin occupied 40% by weight of the total resin solid and the epoxy resin occupied 60% by weight of the total resin solid, whereby a base resin for a primer coating was prepared. As a result of the NMR analysis, it was found that this base resin contained 4 meq/g of hydroxyl groups, and the specific gravity of the heat-cured product as measured by a density gradient tube was 1.30.

An oxidized polyethylene having an oxygen content of 5.5% by weight, a saponification value of 20, a density of 0.99 and an average molecular weight of 7000 was dissolved in hot xylene so that the solid content was 10% by weight, and the solution of the oxidized polyethylene was mixed with the above base resin composition at a mixing weight ratio shown in Table 1, to thereby form a primer coating composition.

The composition was coated on a surface-treated steel plate (Hi-Top ® manufactured by Toyo Kohan) having a thickness of 0.2 mm in such an amount that the thickness of the coating after drying and curing was 5 $\mu$, and the coated plate was heated at 200° C. for 10 minutes.

The corrosion resistance and processability of the coated steel plate was evaluated by examining the presence or absence of rust after outdoor exposure for 10 days and the processability was evaluated by examining the presence or absence of damages by the bending test where the sample was bent up to 2T. Results are shown in Table 1.

The primer layer of sample No. 4 in Table 1 was divided into thin layers having a thickness of about 1 $\mu$ according to the surface polishing method, and they were analyzed by the infrared absorption spectrum analysis according to the KBr tablet method with respect to an absorption at 2920 cm$^{-1}$. It was found that though the average content of the oxidized polyethylene in the primer layer was 20% by weight, the distribution ratio of the oxidized polyethylene was 88% in the uppermost face layer (LS), 9% in the intermediate layer (LM) and 3% in the bottom face layer (LB) contacted with the steel plate. Thus, it was confirmed that the oxidized polyethylene was distributed predominantly in the surface portion to which an olefin resin was to be bonded.

A sheet of a low density polyethylene (having a melt index of 4 and a density of 0.927) having a thickness of 0.5 mm was hot-pressed to the primer layer of the coated steel plate under a pressure of 5 Kg/cm$^2$ at a temperature of 180° C. for 1 minute. The bonding strength between the coated chemically treated steel plate and the polyethylene was measured as the peel strength (g/cm) to obtain results shown in Table 1.

Table 1

| Sample No. | Mixing Ratio (% by weight) | | Peel Strength (g/cm) | Properties [1] of Coated Steel Plate | |
|---|---|---|---|---|---|
| | Base Resin | Oxidized Polyethylene | | Corrosion Resistance | Processability |
| 1 | 50 | 50 | 1000 – 2000 | Δ | X |
| 2 | 60 | 40 | 2000 – 5000 | O | Δ |
| 3 | 70 | 30 | 2000 – 5000 | O | O |
| 4 | 80 | 20 | 1000 – 4000 | O | O |
| 5 | 90 | 10 | 1000 – 3000 | O | O |
| 6 | 95 | 5 | 1000 – 2000 | O | O |
| 7 | 99 | 1 | 300 – 1000 | O | O |
| 8 | 99.5 | 0.5 | 100 – 200 | O | O |
| 9 | 99.8 | 0.2 | 100 – 200 | O | O |

Note [1]
O : good, Δ : medium, X : bad

EXAMPLE 2

In the same manner as described in Example 1, a base resin composition was prepared from 50 parts by weight of an acrylic resin derived from 2 moles of glycidyl methacrylate, 4 moles of methyl methacrylate and 4 moles of 2-ethylhexyl acrylate and 50 parts by weight of an epoxy resin (Epikote ® No. 1009 manufactured by Shell Chemical). When the carbonyl group content of this base resin was calculated from the mixing ratio of the starting materials, it was found that the carbonyl group content was 50 meq/g. The specific gravity of the cured produce of the base resin as measured by a density gradient tube was 1.15. Then, in the same manner as described in Example 1, 20 parts by weight of the same oxidized polyethylene as used in Example 1 was mixed with 80 parts of the base resin to form a primer coating composition.

The composition was coated to a tin-plated steel plate and heated at 200° C. for 10 minutes to form a primer-coated steel plate.

The same low density polyethylene as used in Example 1 was press-bonded to the primer-coated steel plate at 200° C. for 1 minute. After cooling, the peel strength between the low density polyethylene and the primer-coated tin-plated steel plate was measured. It was found that the peel strength was 1000 to 3000 g/cm. Both the processability and the corrosion resistance of the bonded structure were excellent.

EXAMPLE 3

An alkyd resin was prepared from 2 moles of dehydrated castor oil, 6 moles of phthalic anhydride and 6 moles of glycerin. The calbonyl group content of this alkyd resin was calculated to be 1.5 meq/g. The specific gravity of the cured product of this resin was 1.21.

In the same manner as described in Example 1, a primer coating composition was prepared by mixing 30 parts by weight of the same oxidized polyethylene as used in Example 1 with 70 parts of the above alkyd resin.

The resulting composition was coated on a polished steel plate having a thickness of 10 μ in such an amount that the dry thickness was 10 μ, and the coated steel plate was heated at 180° C. for 10 minutes to obtain a primer-coated steel plate.

The same low density polyethylene as used in Example 1 was press-bonded to the coated steel plate at 180° C. for 1 minute. The peel strength of the bonding was 500 to 1000 g/cm.

EXAMPLE 4

Twenty parts by weight of a low-molecular-weight vinyl chloride-vinyl acetate copolymer (VYHH®) manufactured by Union Carbide) was mixed with 80 parts by weight of the same base resin composition as used in Example 1, to form a coating composition free of an oxidized polyethylene. This composition was coated on a surface-treated steel plate (Hi-Top manufactured by Toyo Kohan) having a thickness of 0.2 mm in such an amount that the thickness of the coating after drying and curing was 5 μ, and the coated plate was heated at 190° C. for 10 minutes. In the same manner as described in Example 1, the same primer composition as used in Example 1, was coated on the undercoated plate. Subsequent operations were conducted in the same manner as in Example 1. The peel strength of the resulting bonding was comparable to that obtained in Example 1.

The processability of the double coated steel plate was highly improved over that of the primer coated steel plate formed in Example 1.

Results of the processability test are shown in Table 2.

Table 2

| Sample No. | Mixing Ratio (% by weight) | | Processability [2] | |
|---|---|---|---|---|
| | Base Resin | Oxidized Polyethylene | Example 1 | Example 4 |
| 1 | 50 | 50 | X | Δ |
| 2 | 60 | 40 | Δ | O |
| 3 | 70 | 30 | O | O |
| 4 | 80 | 20 | O | ⊚ |
| 5 | 90 | 10 | O | ⊚ |
| 6 | 95 | 5 | O | ⊚ |
| 7 | 99 | 1 | O | ⊚ |
| 8 | 99.5 | 0.5 | O | ⊚ |
| 9 | 99.8 | 0.2 | O | ⊚ |

Note [2]
⊚: very good, O : good, Δ : medium, X : bad

EXAMPLE 5

In the same manner as described in Example 1, a base resin composition of a copolymer derived from 2 moles of vinyl acetate and 8 moles of methyl methacrylate was prepared and 10 parts by weight of an oxidized polyethylene having an oxygen content of 6.2% by weight, a saponification value of 15, a density of 0.98 and an average molecular weight of 5000 was mixed with 90 parts by weight of the base resin to form a primer composition.

The base resin was found to have a specific gravity of 1.02 and the calculated carbonyl content of the base resin was 2 meq/g.

The primer composition was coated on a chemically treated steel plate (Hi-Top® manufactured by Toyo Kohan) in such an amount that the dry thickness was 5 μ, and the same low density polyethylene as used in Example 1 was hot-bonded under pressure to the coated steel plate. The peel strength of the resulting bonding was lower than 100 g/cm.

The oxidized polyethylene content in the primer layer was examined according to the surface polishing method. It was found that the oxidized ethylene content was about 10% by weight in each of the uppermost face layer of a thickness of about 1 μ, the intermediate layer of a thickness of 1 μ and the bottom face layer.

EXAMPLE 6

In the same manner as described in Example 1, a polyolefin indicated in Table 3 was incorporated in the same base resin as used in Example 1 to form a primer coating composition in which the solid content in the mixed solvent (a 1:1 mixed solvent of methylisobutyl ketone and methylethyl ketone) was 30% by weight. The composition was coated on a degreased steel plate having a thickness of 0.3 mm and the coated steel plate was heated at 100° C. for 10 minutes in an electric oven to form a primer coating having a thickness of 6 μ. A sheet of a low density polyethylene (having a melt index of 4 and a density of 0.927) having a thickness of about 0.5 mm was hot-pressed to the primer-coated steel plate under a pressure of 5 Kg/cm² at a temperature of 180° C. for 1 minute, and the bonded assembly was cooled to a temperature approximating room temperature to obtain a bonded structure of the metal substrate, the primer coating and the low density polyethylene.

With respect to each of the primer-coated steel plates, the corrosion resistance was evaluated by examining the presence or absence of rust after 30 days' outdoor exposure, and the processability was evaluated by examining the presence or absence of damages by the bending test where the sample was bent up to 2T. Further, the distribution ratio of the polyolefin in the respective layer portions of the primer caoting was determined in the same manner as described in Example 1. In this Example, the primer layer having a thickness of 6 μ was divided in the uppermost face layer (LS) of a thickness of 2 μ, the intermediate layer (LM) of a thickness of 2 μ and the bottom face layer (LB) of a thickness of 2 μ contacted with the metal substrate, and the distribution ratio was determined with respect to each of these layers.

Each of the polyethylene-metal bonded structures was subjected to the peeling test at a peeling speed of 50 mm/min, a temperature of 20° C. and a peeling angle of 180° by using a Tensilon versatile tensile tester, to determine the peel strength and the peeled interface.

Results of the foregoing measurements are shown in Table 3. As will readily be understood from these results, when oxidized polyethylenes specified in this invention were incorporated in amounts specified in this invention, both the properties of the prime-coated steel plates and the bonding strength between the polyethylene and the metal substrate were excellent.

Further, it was found that in each of primer layers formed by using the specific oxidized polyethylene according to the present invention, the oxidized polyethylene was distributed predominantly in the uppermost face layer adjacent to the polyethylene layer.

For example, "PE-B" indicates that peeling was caused in the interface between the polyethylene layer Table 3

| Sample No. | Polyolefin [1] Incorporated in Primer Coating Composition | Properties of Polyolefin Incorporated in Primer Coating Composition | | | |
|---|---|---|---|---|---|
| | | average molecular weight | density (g/cc) | saponification value (mg KOH/g) | oxygen concentration (%) |
| 1 | not added | — | — | — | — |
| 2 | polyethylene wax | 2500 | 0.93 | 0 | 0 |
| 3 | high density polyethylene | 95500 | 0.96 | 0 | 0 |
| 4 | oxidized polyethylene | 3000 | 0.93 | 19.2 | 5.36 |
| 5 | " | 5000 | 0.96 | 8.5 | 2.48 |
| 6 | " | 6500 | 0.98 | 15 | 0.56 |
| 7 | " | 6500 | 1.00 | 38.5 | 4.35 |
| 8 | " | 6500 | 0.99 | 1.3 | 0.10 |
| 9 | " | 15000 | 0.97 | 5.0 | 0.93 |
| 10 | " | 6500 | 1.00 | 38.7 | 4.35 |
| 11 | " | 6500 | 1.00 | 38.7 | 4.35 |
| 12 | " | 6500 | 1.00 | 38.7 | 4.35 |

| Sample No. | Amount (%) Incorporated of Polyolefin | Distribution Ratio (%) of Polyolefin | | | Results of Peeling Test of Bonded Structure | | Properties of Primer-Coated Steel Plate | |
|---|---|---|---|---|---|---|---|---|
| | | LS | LM | LB | peel strength(g/cm) | peeled interface [2] | corrosion resistance | processability |
| 1 | 0 | 0 | 0 | 0 | 0 | PE-B | O | O |
| 2 | 20 | 92.0 | 7.6 | 0.4 | 0 | PE-B | Δ | X |
| 3 | 20 | 89.5 | 9.3 | 1.2 | 0 | PE-B | Δ | X |
| 4 | 20 | 94.1 | 5.7 | 0.2 | 500 | PE-B | O | O |
| 5 | 20 | 94.1 | 5.0 | 0.9 | 900 | B-B | O | O |
| 6 | 20 | 88.0 | 9.5 | 1.5 | 1900 | B-B | O | O |
| 7 | 20 | 90.0 | 8.6 | 1.4 | 2300 | B-B | O | O |
| 8 | 20 | 86.4 | 11.8 | 1.8 | 200 | B-B | O | O |
| 9 | 20 | 86.0 | 12.0 | 2.0 | 1500 | B-B | O | O |
| 10 | 1.0 | 99.2 | 0.8 | 0 | 800 | B-B | O | O |
| 11 | 5.0 | 96.5 | 3.5 | 0 | 2200 | B-B | O | O |
| 12 | 30 | 75.3 | 21.5 | 3.2 | 1600 | B-B | O | O |

| Sample No. | Polyolefin [1] Incorporated in Primer Coating Composition | Properties of Polyolefin Incorporated in Primer Coating Composition | | | |
|---|---|---|---|---|---|
| | | average molecular weight | density (g/cc) | saponification value (mg KOH/g) | oxygen concentration (%) |
| 13 | oxidized polyethylene | 6500 | 1.00 | 38.7 | 4.35 |
| 14 | " | 6500 | 1.00 | 38.7 | 4.35 |
| 15 | " | 4500 | 0.98 | 29.0 | 4.25 |
| 16 | " | 2500 | 0.92 | 21.0 | 11.50 |
| 17 | Ionomer | 6700 | 0.96 | 12 | 3.01 |
| 18 | maleic acid-modified polyethylene | 10500 | 0.95 | 18.5 | 4.20 |
| 19 | EVA | 4000 | 0.95 | 17.5 | 9.5 |

| Sample No. | Amount (%) Incorporated of Polyolefin | Distribution Ratio (%) of Polyolefin | | | Results of Peeling Test of Bonded Structure | | Properties of Primer-Coated Steel Plate | |
|---|---|---|---|---|---|---|---|---|
| | | LS | LM | LB | Peel strength(g/cm) | peeled interface [2] | corrosion resistance | processability |
| 13 | 50 | 53.3 | 28.2 | 18.5 | 500 | B-M | Δ | X |
| 14 | 70 | 47.4 | 30.5 | 22.1 | 400 | B-M | Δ | X |
| 15 | 20 | 91.8 | 6.9 | 1.3 | 100 | PE-B | O | O |
| 16 | 20 | 92.0 | 6.4 | 1.6 | 200 | PE-B | O | O |
| 17 | 20 | 41.0 | 36.9 | 22.1 | 200 | PE-B | Δ | Δ |
| 18 | 20 | 49.0 | 30.5 | 20.5 | 300 | PE-B | Δ | Δ |
| 19 | 20 | 40.0 | 30.8 | 29.2 | 50 | PE-B | Δ | Δ |

Note [1]
Ionomer: of the zinc ion type, manufactured by Du Pont. EVA: ethylene-vinyl acetate copolymer having a vinyl acetate content of 15 %.
Note [2]
PE: polyethylene face B: primer coating face M: metal face and the primer coating layer. Further, "B-B" indicates that cohesive failure was caused in the primer coating layer.

EXAMPLE 7

Metal-olefin resin bonded structures were prepared in the same manner as described in Example 1 except that a tin-plated steel plate on which a vinyl-phenolic paint composed of a resol type phenolic resin and a vinyl chloride-vinyl acetate copolymer resin at a weight ratio of 90:10 had been coated in an amount of 5 g/m² as the dry film was used instead of the surface-treated steel plate and a mixed solvent or single solvent shown in Table 4 was used instead of the mixed solvent of methylisobutyl ketone and methylethyl ketone.

With respect to each of the bonded structures, the distribution ratio of the oxidized polyethylene in the respective layers of the primer coating was determined and the processability of the primer-coated steel plate was examined. Obtained results are shown in Table 4.

Table 4

| Sample No. | Solvent Used Kind | Boiling Point (° C.) | Mixing Ratio (% by weight) | Distribution Ratio (%) of Oxidized Polyethylene in Respective Layers of Primer Coating | | | Processability |
|---|---|---|---|---|---|---|---|
| | | | | LS | LM | LB | |
| 1 | MIBK* | 117 | | | | | |
| | DAA** | 164 | 10 | 75.1 | 21.0 | 3.9 | O |
| | xylene | 135–145 | | | | | |
| 2 | n-butanol | 118 | 20 | | | | |
| | xylene | 135–145 | 40 | | | | |
| | cyclohexanone | 155 | 30 | 90.5 | 8.5 | 1.0 | O |
| | isophorone | 214 | 10 | | | | |
| 3 | MEK*** | 80 | 50 | | | | |
| | xylene | 110 | 50 | 94.1 | 5.6 | 0.3 | O |
| 4 | DAA** | 164 | 47 | | | | |
| | Shell Sol | 162 | 47 | 40.1 | 28.4 | 31.5 | X |
| | n-butanol | 118 | 6 | | | | |
| 5 | MIBK* | 117 | 100 | 36.0 | 31.5 | 32.5 | X |

*methylisobutyl ketone,
**diacetone alcohol,
***methylethyl ketone

EXAMPLE 8

A vinyl-phenolic lacquer, which is used usually for tin-plate, was coated on a lusterless tin-plated steel plate having a thickness of 0.27 mm (non-reflow electrically plated tin-plate) in a dry thickness of 5 μ, and the coating was heated at 180° C. for 10 minutes.

The 9 kinds of primer compositions shown in Example 1 were separately coated on the so pre-coated tin-plates and non pre-coated lusterless tin plates respectively in a dry thickness of 2 μ, and the coatings were heated at 200° C. for 10 minutes.

The primer layer of sample No. 4 shown in Table 5 was divided into thin layers having a thickness of about 1 μ were analyzed. It was found that distribution ratio of oxidized polyethylene was 72% in the uppermost face layer and 28% in the bottom face layer.

The corrosion resistances and processability of the above mentioned pre-coated and non-precoated tin-plate were examined as described in Example 1

Results are shown in Table 5.

When pre-coated tin-plate were used, the corrosion resistance and the processability were highly improved over the non-precoated tin-plate.

Table 5

| Sample No. | Mixing Ratio wt.% | | Pre-coated | | Non-pre-coated | |
|---|---|---|---|---|---|---|
| | Base Resin | Oxidized Polyethylene | (1) | (2) | (1) | (2) |
| 1 | 50 | 50 | O | O | X | X |
| 2 | 60 | 40 | O | O | Δ | X |
| 3 | 70 | 30 | ⊙ | ⊙ | O | Δ |
| 4 | 80 | 20 | ⊙ | ⊙ | O | O |
| 5 | 90 | 10 | ⊙ | ⊙ | O | O |
| 6 | 95 | 5 | ⊙ | ⊙ | O | O |
| 7 | 99 | 1 | ⊙ | ⊙ | O | O |
| 8 | 99.5 | 0.5 | ⊙ | ⊙ | O | O |
| 9 | 99.8 | 0.2 | ⊙ | ⊙ | O | O |

(1) Corrosion Resistance
(2) Processability

What we claim is:

1. An olefin resin-metal bonded structure having high corrosion resistance and peel strength, which comprises a metal substrate and an olefin resin layer bonded together through a primer layer, said primer layer being formed by applying a coating solution containing (a) an oxidized polyethylene having an oxygen content of 0.1 to 10% by weight, a saponification value of 2 to 200, a density of 0.90 to 1.2 and an average molecular weight of 1000 to 50000 and (B) a coating-forming base resin having a density higher by at least 0.1 than the oxidized polyethylene and containing a functional group selected from hydroxyl and carbonyl groups at a concentration of at least 1 meq/g, the mixing weight ratio of the oxidized polyethylene (A) and the base resin (B) being within the following range:

(A):(B) = from 0.2:99.8 to 45:55, said primer layer having a distribution structure in which each of the concentrations of the oxidized polyethylene (A) and the base resin (B) varies with respect to the thickness direction of said primer layer with such a gradient that the base resin (B) is concentrated predominantly on that side of the primer layer toward the metal substrate and the oxidized polyethylene (A) is concentrated predominantly on that side of the primer layer toward the olefin resin.

2. A bonded structure as set forth in claim 1 wherein when said concentrations divide the primer layer into three layers, an uppermost layer (LS), an intermediate layer (LM) and a bottom face layer (LB) contacted with the metal substrate, the distribution ratio of the oxidized polyethylene being at least 50% in the uppermost layer (LS) and not higher than 10% in the bottom face layer (LB), said distribution ratio of the oxidized polyethylene being expressed by the following formula:

$$Dx = \frac{Wx \times 10000}{W \times CA}$$

wherein W denotes the weight (mg/dm²) of the primer layer per unit area, CA denotes the average content (% by weight) of the oxidized polyethylene in the primer layer, Wx denotes the weight (mg/dm²) of the oxidized polyethylene per unit area in the divided layer of the primer layer, and Dx denotes the distribution ratio (% by weight) of the oxidized polyethylene in the divided layer.

3. A bonded structure as set forth in claim 1 wherein said distribution ratio of the oxidized polyethylene is at least 70% in the uppermost face layer (LS) and not higher than 5% in the bottom face layer (LB).

4. A bonded structure as set forth in claim 1 wherein said base resin is selected from the group consisting of phenolic resin-epoxy resin paints, urea resin-epoxy resin paints, melamine resin-epoxy resin paints and phenolic resin-epoxy resin-vinyl resin paints.

5. A bonded structure as set forth in claim 1 wherein the primer layer is formed on the metal substrate in such an amount coated that the amount coated of the oxidized polyethylene (A) is 0.1 to 10 mg/dm² and the amount coated of the base resin (B) is 10 to 100 mg/dm².

6. An olefin resin-metal bonded structure having high corrosion resistance and peel strength, which comprises a metal substrate and an olefin resin layer bonded together through a primer layer, said primer layer being formed by applying a coating solution containing (A) an oxidized polyethylene having an oxygen content of 0.1 to 10% by weight, a saponification value of 2 to 200, a density of 0.90 to 1.2 and an average molecular weight of 100 to 50000 and (B) a coating-forming base resin having a density higher by at least 0.1 than the oxidized polyethylene and containing a functional group selected from hydroxyl and carbonyl groups at a concentration of at least 1 meq/g, the mixing weight ratio of the oxidized polyethylene (A) and the base resin (B) being within the following range:

(A) " (B) = 0.2:99.8 to 45:55 said primer layer having a distribution structure in which each of the concentrations of the oxidized polyethylene (A) and the base resin (B) varies with respect to the thickness direction of said primer layer with such a gradient that the base resin (B) is concentrated predominantly on that side of the primer layer toward the metal substrate and the oxidized polyethylene (A) is concentrated predominantly on that side of the primer layer toward the olefin resin; the concentrations dividing the primer layer into three layers, an uppermost layer (LS), an intermediate layer (LM) and a bottom face layer (LB) adjacent the metal substrate, the distribution ratio of the oxidized polyethylene being at least 50% in the uppermost layer (LS) and not higher than 10% in the bottom face layer (LB), said distribution ratio of the oxidized polyethylene being expressed by the following formula:

$$Dx = \frac{Wx \times 10000}{W \times CA}$$

wherein W denotes the weight (mg/dm²) of the primer layer per unit area, CA denotes the average content (% by weight) of the oxidized polyethylene in the primer layer, Wx denotes the weight (mg/dm²) of the oxidized polyethylene per unit area in the divided layer of the primer layer (the layer LS, LB or LM), and Dx denotes the distribution ratio (% by weight) of the oxidized polyethylene in the divided layer; said base resin is selected from the group consisting of phenolic resin-epoxy resin paints, urea resin-epoxy resin paints, melamine resin-epoxy paints and phenolic resin-epoxy resin-vinyl resin paints; and wherein the primer layer is formed in such an amount coated that the amount of the oxidized polyethylene (A) is 0.1 to 10 mg/dm² and the amount coated of the base resin (B) is 10 to 100 mg/dm².

7. A bonded structure as set forth in claim 6 wherein an oxidized polyethylene-free undercoat composed of a resin selected from the group consisting of phenolic-epoxy resins, phenolic-amino resins, vinyl-phenolic resins, epoxy-vinyl resins and phenol-epoxy-vinyl resins is formed in an amount coated of 10 to 200 mg/dm² as solids between said primer layer and said metal substrate.

8. A closure comprising a closure shell formed from a metal sheet, a primer coating layer formed at least on the inner face of said closure shell and a sealing packing of an olefin resin bonded to the closure shell through said primer coating, said primer coating layer being formed by applying on said metal sheet a coating composition containing (A) an oxidized polyethylene having an oxygen content of 0.1 to 10% by weight, a saponification value of 2 to 200, a density of 0.90 to 1.2 and an average molecular weight of 1000 to 50000 and (B) a coating-forming base resin having a density higher by at least 0.1 than the oxidized polyethylene and containing a functional group selected from hydroxyl and carbonyl groups at a concentration of at least 1 meq/g, the mixing weight ratio of the oxidized polyethylene (A) and the base resin (B) being within the following range:

(A):(B) = from 0.2:99.8 to 45:55, said primer layer having a distribution structure in which each of the concentrations of the oxidized polyethylene (A) and the base resin (B) varies with respect to the thickness direction of said primer layer with such a gradient that the base resin (B) is concentrated predominantly on that side of the surface contacting the metal substrate and the oxidized polyethylene (A) is concentrated predominantly on that side of the surface contacting the olefin resin; said concentration dividing the primer layer into three layers, an uppermost layer (LS), an intermediate layer (LM) and a bottom face layer (LB) contacted with the metal substrate, the distribution ratio of the oxidized polyethylene being at least 50% in the uppermost layer (LS) and not higher than 10% in the bottom face layer (LB), said distribution ratio of the oxidized polyethylene being expressed by the following formula:

$$Dx = \frac{Wx \times 10000}{W \times CA}$$

wherein W denotes the weight (mg/dm²) of the primer layer per unit area, CA denotes the average content (% by weight) of the oxidized polyethylene in the primer layer, Wx denotes the weight (mg/dm²) of the oxidized polyethylene per unit area in the divided layer of the primer layer (the layer LS, LB or LM), and Dx denotes the distribution ratio (% by weight) of the oxidized polyethylene in the divided layer; said base resin is selected from the group consisting of phenolic resin-epoxy resin paints, urea resin-epoxy resin paints, melamine resin-epoxy resin paints and phenolic resin-epoxy resin-vinyl resin paints, and wherein the primer layer is formed on the metal substrate in such an amount coated that the amount coated of the oxidized polyethylene (A) is 0.1 to 10 mg/dm$^2$ and the amount coated of the base resin (B) is 10 to 100 mg/dm$^2$.

* * * * *